United States Patent [19]

Murakami et al.

[11] Patent Number: 4,920,290
[45] Date of Patent: Apr. 24, 1990

[54] ACTIVE MAGNETIC BEARING APPARATUS

[75] Inventors: Chikara Murakami; Atsushi Nakajima; Hirokuni Hiyama, all of Tokyo; Satoshi Inanaga; Katsuhide Watanabe, both of Kanagawa, all of Japan

[73] Assignees: National Aerospace Laboratory, Chofu; Ebara Research Co., Ltd., Fujisawa, both of Japan

[21] Appl. No.: 265,726

[22] Filed: Nov. 1, 1988

[51] Int. Cl.⁵ .............................................. F16C 39/06
[52] U.S. Cl. ................................................... 310/90.5
[58] Field of Search ............... 310/90.5; 324/207, 208

[56] References Cited

U.S. PATENT DOCUMENTS

| | | | |
|---|---|---|---|
| 3,307,884 | 3/1967 | Dunlap | 310/90.5 |
| 3,860,300 | 1/1975 | Lyman | 310/90.5 |
| 3,988,658 | 10/1976 | Meinke | 310/90.5 |
| 4,233,905 | 11/1980 | Gottzein | 310/90.5 |
| 4,417,772 | 11/1983 | Robinson | 310/90.5 |
| 4,583,031 | 4/1986 | Brunet | 310/90.5 |

FOREIGN PATENT DOCUMENTS

| | | |
|---|---|---|
| 47-39943 | 12/1972 | Japan . |
| 47-43637 | 12/1972 | Japan . |
| 47-43841 | 12/1972 | Japan . |
| 48-1538 | 1/1973 | Japan . |
| 48-1539 | 1/1973 | Japan . |

Primary Examiner—R. Skudy
Attorney, Agent, or Firm—Armstrong, Nikaido, Marmelstein, Kubovcik & Murray

[57] ABSTRACT

An active magnetic bearing apparatus wherein an object designed to be suspended is supported by a plurality of active magnetic bearings and is suspended in a noncontact state so that the object is caused to move in either a rotational or reciprocating manner in such a state. The magnetic force of the respective active magnetic bearings is controlled electrically. A delay control mechanism is provided to cause a delay in the starting-up time for the respective active magnetic bearings so that these bearings are caused to start up sequentially when they are activated, thus making it possible to make the capacity of the power source as small as possible.

5 Claims, 1 Drawing Sheet

ACTIVE MAGNETIC BEARING APPARATUS

FIELD OF THE INVENTION

The present invention relates to a magnetic bearing apparatus employing magnetic supporting means, and more particularly to an active magnetic bearing apparatus for suspending an object designed to be suspended in a non-contact state through a controlling magnetic force by means of electrical control, as well as through detection by means of a sensor of the position of the object designed to be suspended.

In general, there are several kinds of active magnetic bearings; some of them are designed to obtain bias magnetic flux by employing permanent magnets, and other utilize direct current to generate the same flux. In these bearings, when the load is small, the current becomes maximum at a starting-up time when an object which is in contact with the bearing is caused to be suspended in a non-contact state, and this maximum current at the starting-up time tends to be used as the capacity of the power source for use in driving the bearing control current during operation of the bearing.

However, in these types of active magnetic bearings, in a case where the load is small, the current needed to operate the bearing in a stationary state becomes much lower as compared with the current at the starting-up time. This means that the capacity of the power source as defined above is too high and hence becomes excessive for the stationary state, causing excess current to be wastefully consumed.

This situation is even worse with an apparatus comprising a plurality of magnetic bearings. This is because the capacity of the power source for such an apparatus inevitably tends to become very large, resulting in even more wasteful and uneconomical consumption of current. Thus, conventional active magnetic bearing apparatus have the drawback that they consume an uneconomically large amount of current and hence cannot facilitate energy conservation measures.

As a means of removing the above mentioned drawbacks which are inherent in the conventional active magnetic bearing apparatus, an object of the present invention is to provide an apparatus for suspending an object by means of a plurality of active magnetic bearings which is capable of reducing and maintaining the capacity of the power source to and at a minimum level during suspension of the object by adopting a configuration designed to provide a delay in the starting-up time for each of the bearings or in the starting-up time for each of the control axes of the bearings such that the bearings are caused to start up sequentially when they are activated, whereby operation of the apparatus can be effected in a stable manner and the capacity of the power source required to run the whole apparatus need not be any larger than that needed to start up one of the magnetic bearings, thus making it possible to reduce current consumption.

SUMMARY OF THE INVENTION

In order to attain the above mentioned objects, the present invention provides an active magnetic bearing apparatus for suspending an object designed to be suspended in a non-contact state under the action of a magnetic force which is electrically controlled so that the object may be moved, by an outside force, in either a rotational or reciprocating manner in such a non-contact state, wherein the object designed to be suspended is supported by a plurality of active magnetic bearings, and a delay control mechanism is provided for the purpose of causing a delay in the starting-up time for individual magnetic bearings such that the magnetic bearings are caused to start up sequentially when they are activated.

BRIEF DESCRIPTION OF THE DRAWING

The drawing attached hereto is a system diagram of an embodiment according to the present invention.

DETAILED DESCRIPTION OF THE PREFERRED EMBODIMENT

Figure 1:
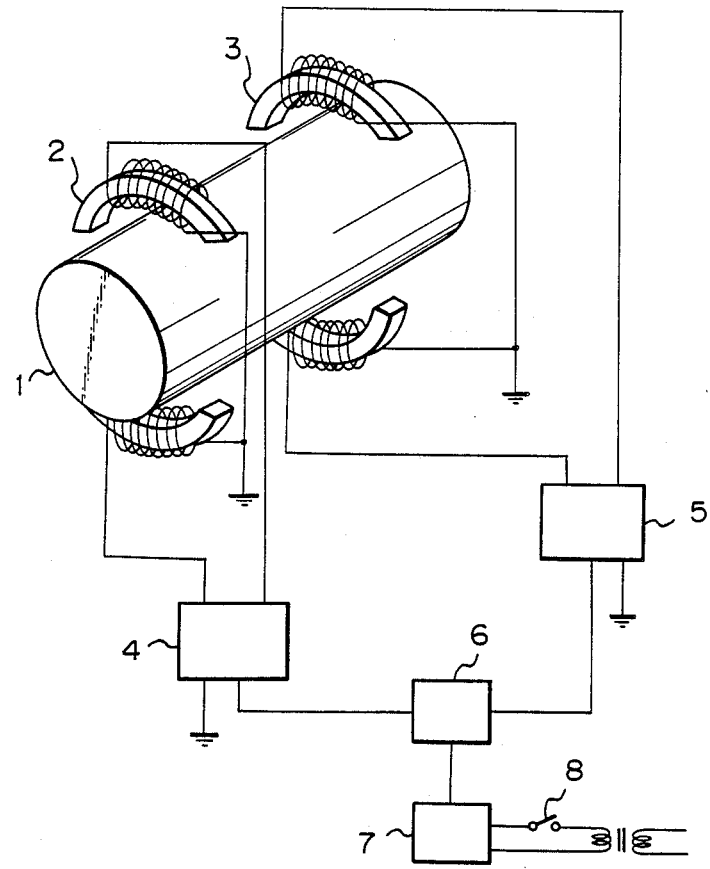

Referring to the drawing, one embodiment of the present invention will be now be described. An apparatus according to the embodiment has a plurality of active magnetic bearings 2 and 3 for rotatably supporting a rotational shaft, an object 1 designed to be suspended, and a sensor (not shown) for detecting the position of the object 1 designed to be suspended, whereby the object 1 designed to be suspended can be suspended in a non-contact state under the action of magnetic force which is electrically controlled. The plurality of magnetic bearings 2 and 3 are, respectively, connected to control circuits 4 and 5 in a corresponding manner. The control circuits 4 and 5 are in turn connected to a power source 7 through a timer 6 which is provided as a delay control mechanism, whereby a current supplied by the power source 7 is distributed to the respective control circuits 4 and 5 via the timer 6. This timer 6 is designed to be connected solely to the control circuit 4 when a main switch 8 is closed and then to the control circuit 5 after a suitable time lag. In this configuration, therefore, the capacity of the power source 7 need not be any larger than that which is sufficient to supply the current needed to start up one of the magnetic bearings.

Instead of the timer 6, a circuit or device such as a delay relay may be provided to cause a slight delay in the starting-up time for the respective magnetic bearings. In such cases, a delay control mechanism like the timer 6 or a delay relay may be preferably placed between the power source 7 and the respective control axes or magnetic bearings 2 and 3.

In the above-described embodiment, where the current needed to start up one of the magnetic bearings 2 and 3 is defined now as being I, the starting-up current needed to simultaneously start up N-pieces of magnetic bearings amounts to NI. However, in an apparatus wherein the capacity of the power source 7 is no larger than that needed to start up one of the magnetic bearings thereof and the load borne by the bearings is small, the object designed to be suspended can be controlled by a remarkably low current once the object 1 designed to be suspended has been caused to move toward the position where it is to be suspended. In such circumstances, the capacity of the power source remains sufficient to start up the next magnetic bearing. In addition, the movement of the object 1 at the starting-up time is remarkably quick, which means that the time during which the starting-up current flows is very short. This enables the plurality of magnetic bearings 2, 3, . . . to be activated in a sequential manner, thus making it possible to suspend the object 1 designed to be suspended in a stable manner without adversely affecting the balanced position thereof. The same will be true of the case where the respective control axes are started up sequentially.

With the magnetic bearing apparatus according to the present invention which comprises a plurality of active magnetic bearings, the capacity of the power source for the control circuit can be made remarkably small by means of a delay control mechanism provided to cause a slight delay in the starting-up time for the bearings. This serves to drastically reduce the cost of power consumption.

The present invention makes full use of the fact that the starting-up current for a magnetic bearing only flows for a very short period of time. In such circumstances, even if the starting-up time for the plurality of bearings is slightly delayed in a sequential manner, the suspension of the object 1 in a stable manner can be effected in almost the same way as the case where all the bearings are started up simultaneously.

What is claimed is:

1. An active magnetic bearing apparatus, comprising:
   a plurality of active magnetic bearings for rotatably supporting a rotational shaft;
   a sensor means for generating position signals corresponding to a detected angular position of said rotational shaft;
   electrical control means for suspending said rotational shaft in a non-contact state by altering the amperage of current to be supplied to said bearings in response to a position signal transmitted from said sensor means and controlling the magnetic force of said magnetic bearings; and
   a delay control means for reducing the starting-up current for a magnetic bearing assembly by sequentially supplying a starting-up current to the respective magnetic bearings with a slight interval between the supply of current to each magnetic bearing.

2. An active magnetic bearing apparatus according to claim 1, wherein said delay control means is a timer disposed between said electrical control means and a power source.

3. An active magnetic bearing apparatus for suspending an object in a non-contact state by electrically controlled magnetic force, such that the object is rotatable or reciprocable in said bearing apparatus, said bearing apparatus comprising:
   a plurality of active magnetic bearings for suspending the object, said bearings being spaced apart from one another in the direction of a rotational axis or a reciprocating movement of the object;
   a power source for supplying power to said active magnetic bearings; and
   delay control means for sequentially connecting said power source to each of said magnetic bearings during start-up, such that after said power source is connected to a first one of said bearings, a predetermined delay occurs before each subsequent bearing is connected to said power source.

4. The magnetic bearing apparatus of claim 3, wherein said delay control means includes a timer for measuring said predetermined delay.

5. The magnetic bearing apparatus of claim 3, wherein said delay control means is a control circuit having a delay relay.

* * * * *